Patented Oct. 17, 1933

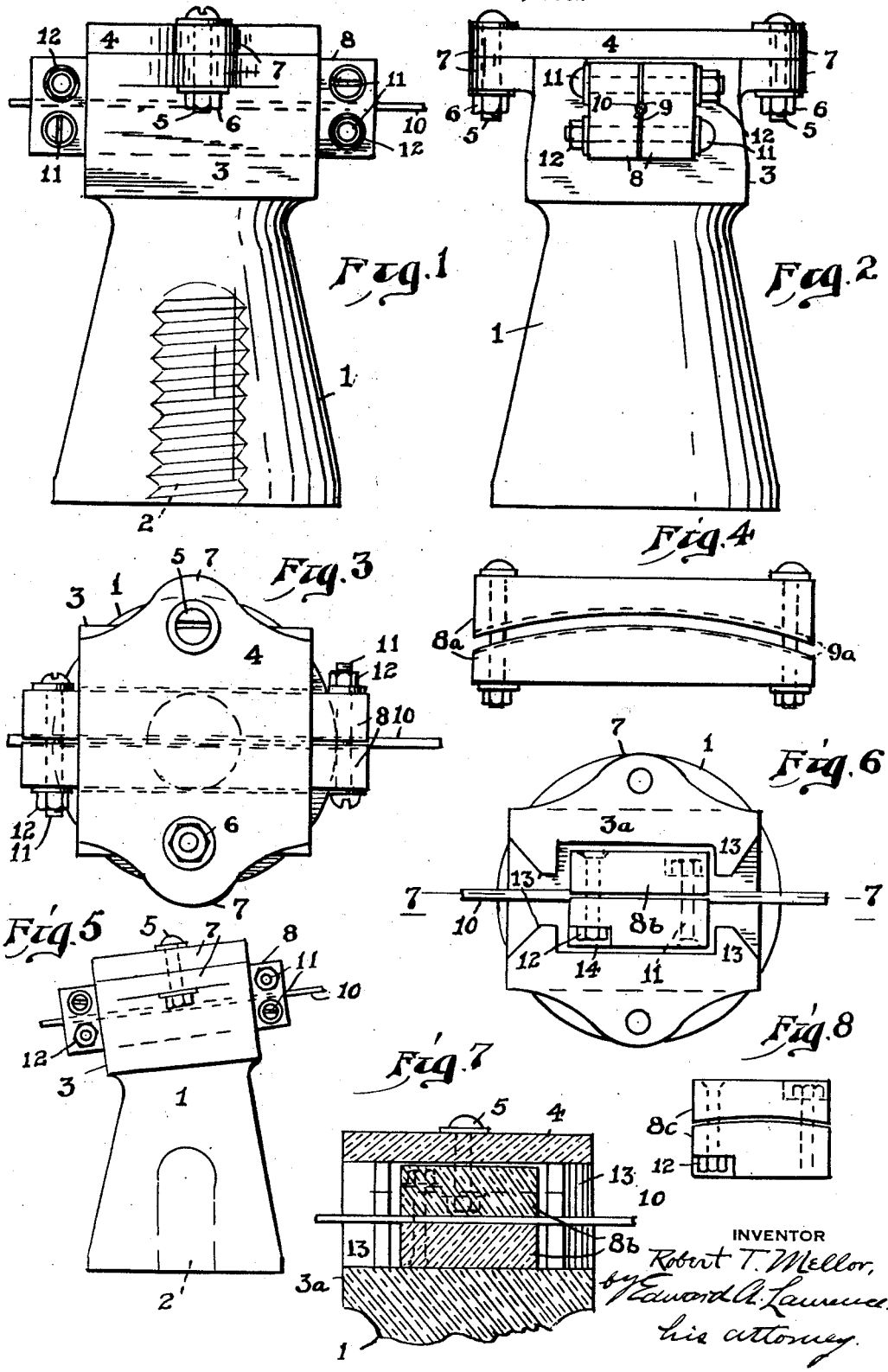
Oct. 17, 1933.   R. T. MELLOR   1,931,203
INSULATING SUPPORT FOR ELECTRICAL CONDUCTORS
Filed March 2, 1932
INVENTOR
Robert T. Mellor,
by Edward A. Lawrence
his attorney.

1,931,203

UNITED STATES PATENT OFFICE 1,931,203

INSULATING SUPPORT FOR ELECTRICAL CONDUCTORS

Robert T. Mellor, Jefferson Township, Allegheny County, Pa.

Application March 2, 1932. Serial No. 596,217

4 Claims. (Cl. 173—314)

While useful generally for the support of electrical conductors my invention is more particularly designed for use in supporting exterior electrical conductors, such as line wires on poles and other supports.

In the present practice pole line insulators are formed of glass or other insulating material and are usually mounted on the poles by screwing the same onto threaded pegs carried by the poles or cross arms, and the conductors at intervals are wired to the insulators.

Such connections for the conductors require considerable time and skill for their installation or removal and are frequently broken loose in a storm or high wind.

Again, the connecting wires if properly applied clamp the conductors to the insulators so tightly that the conductors are incapable of longitudinal movement relative to the insulators in response to wind pressure and thus an undue strain is imposed on both the conductors and the insulators which frequently results in breakage of one of the same.

Again where the conductor turns a horizontal angle in the line or where there is a change of alinement in a vertical plane, as for instance at the bottom of a valley or at the top of a hill, an undue and dangerous strain is imposed on both the conductor and the insulator, the conductor frequently becoming kinked and thus substantially incapable of longitudinal movement relative to the insulator. This frequently results in breaking the conductor.

To overcome these and other faults, I have invented an insulating support having a stand which is provided with means for attaching it to the pole or other support, as for instance being provided with a threaded hole for screwing it onto the threaded peg, and which has formed integral with or fixedly mounted on said stand a box whose ends are open and whose top is closed by a removable lid. In the box are mounted a pair of coacting clamping blocks with mating grooves on their abutting faces, which blocks are clamped snugly on the wire. The blocks are arranged for a limited sliding movement relative to the box to provide the necessary "give" for the wire in response to wind pressures and the like.

Where the conductor runs in a straight and substantially horizontal alinement, the mating grooves are likewise straight, but where conductors are curved either laterally or in a vertical plane, the mating grooves are arcuate and by turning the blocks over into the proper position the curve may be disposed laterally in either direction or may be disposed in a vertical plane in either direction.

Where the conductors are running up or down a hill, the boxes may be disposed angularly to the stands of the insulating support to thus dispose the grooves of the clamping blocks at the desired angle to the horizontal.

Other novel features of construction, and also of arrangement of parts, will appear from the following description.

In the accompanying drawing, wherein I have illustrated a practical embodiment of the principles of my invention, Fig. 1 is a side elevation of the insulating support, showing a conductor held thereby.

Fig. 2 is an end view of the insulating support taken at an angle of ninety degrees from Fig. 1.

Fig. 3 is a top plan view of the same.

Fig. 4 is a plan view of a pair of clamping blocks having arcuate grooves.

Fig. 5 is a view similar to Fig. 1 but on smaller scale and showing a modification wherein the box is disposed angularly to the stand.

Fig. 6 is a view similar to Fig. 3 but showing a different arrangement of the box and clamping blocks, the lid being omitted.

Fig. 7 is a sectional view of the box, blocks and lid taken on the line 7—7 in Fig. 6.

Fig. 8 shows a modified form of clamping block for use with the form of box shown in Figs. 6 and 7.

Referring first to Figs. 1 to 3 inclusive, 1 represents the stand of the insulating support which is shown as in the shape of a downwardly enlarging truncated cone provided with an axially located threaded bore 2 so that the insulating support may be screwed onto the usual threaded peg of a pole.

It will be understood of course that the stand may be of any convenient form and provided with any suitable means for conveniently securing it to a support.

3 represents a box fixed on the stem 1 and preferably formed integrally therewith. The opposite ends of the box are open. The top of the box is closed by means of a lid 4 which may be detachably held in place by any convenient means, such as by the bolts 5 and nuts 6, which bolts extend through the ears 7 of the box and the lid which mate and are provided with registering bolt holes.

The material of the body, box and lid may be any substance of suitable insulating qualities and strength, such as glass, porcelain or the like.

8 represents a pair of coacting clamping blocks which should also be of suitable insulating material.

The blocks 8 are provided on their abutting faces with coacting grooves 9, preferably semi-circular, which mate together to form a bore to receive the conductor 10. The blocks are clamped together and to the conductor by means of the bolts 11 which pass through registering holes in the ends of the blocks and nuts 12.

The mated blocks slidably fit in the box 3 with their ends protruding through the open ends of the box and the movement of the blocks relative to the box is limited by the contact of the bolt heads and nuts with the ends of the box.

Where the conductor extends in a substantially horizontal line and does not bend or curve to either side or in a vertical plane at the insulating support, the mating faces of the blocks 8 are planes parallel to their outer longitudinal surfaces and their grooves 9 are also straight, as indicated in Figs. 1, 2 and 3.

However, in Fig. 4 I show the pair of coacting clamping blocks 8a provided with arcuate coacting surfaces so that the bore formed by the mating grooves 9a will be arcuate.

Thus where the conductor changes its horizontal direction at the pole the blocks 8a are used, being installed with their curved bore disposed in the proper direction. If the change in direction is in a vertical plane, as for instance upwardly at a low point in the line or downwardly at a high point in the line, the blocks are disposed in the box 3 to provide a bore curved in the proper direction.

In Fig. 5 I show the box 3 cantered relative to the stand 1. This arrangement is advantageous where the conductor is inclined to the horizontal.

In Figs. 6 and 7 I show the box 3a provided with vertically disposed and inwardly extending ribs 13 at the ends against which the blocks 8b strike to limit their movement with the conductor relative to the box. In this form the blocks are shorter relative to the box so to have relative movement therein. The blocks are cut away at their ends, as at 14, to provide a seat for the nuts 12 and the other ends of the blocks are countersunk to receive the heads of the bolts 11, thus preventing contact by the bolts and nuts with the walls of the box.

In Fig. 8 I show the blocks 8c provided with arcuate mating surfaces.

It is evident that by selecting the proper character of blocks, as to the nature of their mating surfaces either plane or arcuate and disposing the blocks in the proper position in the box, any disposal of the conductor, either in a straight horizontal direction or with a change of direction either horizontally or vertically may be provided for. The conductor is securely attached but at the same time a limited longitudinal movement of the conductor relative to the insulating support is provided for.

The insulating supports are readily mounted in place and the conductor is quickly and conveniently connected to the insulating supports or disconnected therefrom.

I claim:—

1. In an insulating support for electrical conductors, the combination of a stand arranged for attachment to a support, a box in fixed relation to the stand and having open ends through which the conductor extends, coacting clamping blocks slidably mounted in said box and having arcuate grooves on their abutting faces which mate to form a bore for the conductor, means for clamping the blocks together and to the conductor, so that the blocks and conductor move together relative to the box, and means for limiting the movement of the blocks relative to the box, the blocks being freely slidable in the box within said limits, the blocks being arranged for reversal in said box whereby to dispose the arcuate bore in different planes.

2. In an insulating support for electrical conductors the combination of a stand arranged for attachment to a support, a box in fixed relation to the stand and having open ends through which the conductor extends, coacting clamping blocks slidably mounted in said box and having arcuate abutting surfaces, said surfaces being provided with grooves which mate to form a bore for the conductor, means for clamping the blocks together and to the conductor, so that the blocks and conductor move together relative to the box, and means for limiting the movement of the blocks relative to the box, the blocks being freely slidable in the box within said limits, the blocks being arranged for reversal in said box whereby to dispose the arcuate bore in different planes.

3. In an insulating support for electrical conductors, the combination of a stand arranged for attachment to a support, a box in fixed relation to the stand and having open ends through which the conductor extends, coacting clamping blocks slidably mounted in said box and having grooves on their abutting faces which mate to form a bore for the conductor, means independent of the box for clamping the blocks together and to the conductor, so that the blocks and conductor move together relative to the box, and means for limiting the movement of the blocks relative to the box, the blocks being freely slidable in the box within said limits, the blocks being arranged for reversal in said box whereby to dispose the bore in different planes.

4. In an insulating support for electrical conductors, the combination of a stand arranged for attachment to a support, a box in fixed relation to the stand and having open ends through which the conductor extends, coacting clamping blocks slidably mounted in said box and having abutting surfaces, said surfaces being provided with grooves which mate to form a bore for the conductor, means independent of the box for clamping the blocks together and to the conductor, so that the blocks and conductor move together relative to the box, and means for limiting the movement of the blocks relative to the box, the blocks being freely slidable in the box within said limits, the blocks being arranged for reversal in said box whereby to dispose the bore in different planes.

ROBERT T. MELLOR.